(12) United States Patent
Iwata (10) Patent No.: US 9,163,957 B2
(45) Date of Patent: Oct. 20, 2015

(54) POSITION SENSOR

(75) Inventor: Masayoshi Iwata, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 467 days.

(21) Appl. No.: 13/606,525

(22) Filed: Sep. 7, 2012

(65) Prior Publication Data

US 2013/0063133 A1    Mar. 14, 2013

(30) Foreign Application Priority Data

Sep. 12, 2011    (JP) .................... 2011-198562

(51) Int. Cl.
| | | |
|---|---|---|
| *G01B 7/14* | (2006.01) | |
| *F16H 63/20* | (2006.01) | |
| *F16H 59/10* | (2006.01) | |
| *G01D 5/14* | (2006.01) | |

(52) U.S. Cl.
CPC .............. *G01D 5/145* (2013.01); *F16H 59/105* (2013.01)

(58) Field of Classification Search
CPC ........................................................ G01B 7/14
USPC ..................................................... 324/207.24
See application file for complete search history.

(56) References Cited

U.S. PATENT DOCUMENTS

| | | |
|---|---|---|
| 6,573,709 B1 | 6/2003 | Gandel et al. |
| 7,552,659 B2 * | 6/2009 | Komatsu et al. ............. 74/335 |
| 2004/0035237 A1 | 2/2004 | Matsui et al. |
| 2007/0216402 A1 | 9/2007 | Blessing et al. |

FOREIGN PATENT DOCUMENTS

| | | |
|---|---|---|
| CN | 201818774 | 5/2011 |
| DE | 10010042 | 7/2001 |
| DE | 102007021231 | 11/2007 |
| EP | 0990821 | 4/2000 |
| EP | 1061290 | 12/2000 |
| JP | 2006-153670 | 6/2006 |
| JP | 2006-347314 | 12/2006 |
| JP | 2008-114720 | 5/2008 |
| JP | 2008-239057 | 10/2008 |
| JP | 2010-107376 | 5/2010 |

(Continued)

OTHER PUBLICATIONS

China Office action, mail date is Oct. 10, 2014.

(Continued)

*Primary Examiner* — Bot Ledynh
(74) *Attorney, Agent, or Firm* — Greenblum & Bernstein, P.L.C.

(57) ABSTRACT

A position sensor for a transmission mode selector lever includes a magnet and three magnetic flux detection elements that detect magnetic flux of the magnet. A determination circuit determines an operation position of the transmission mode selector lever based on output levels of detection signals generated by the magnetic flux detection elements. The magnet includes first and second magnetized regions. The first and second magnetized regions are formed so that when the magnet is moved relative to the magnetic flux detection elements along a straight line, output levels of the detection signals generated by the magnetic flux detection elements change in accordance with a proportional relationship having a first or second gradient relative to the distance of the movement. The three detection elements are spaced apart from each other on a straight line that is parallel to the first and second straight lines.

17 Claims, 7 Drawing Sheets

(56) References Cited

FOREIGN PATENT DOCUMENTS

| JP | 2010-145236 | 7/2010 |
| JP | 2011-11617 | 1/2011 |
| JP | 2011-143852 | 7/2011 |

OTHER PUBLICATIONS

Search report from E.P.O., mail date is Sep. 23, 2014.

* cited by examiner

POSITION SENSOR

CROSS-REFERENCE TO RELATED APPLICATIONS

This application is based upon and claims the benefit of priority from prior Japanese Patent Application No. 2011-198562, filed on Sep. 12, 2011, the entire contents of which are incorporated herein by reference.

BACKGROUND

The present invention relates to a position sensor that detects an operation position.

A vehicle includes an automatic transmission mode selector lever and a position sensor, which detects the operation position of the selector lever. The selector lever is movable along a gearshift gate. Japanese Laid-Open Patent Publication No. 2008-239057 (paragraphs 0029 and 0031) discloses a position sensor that detects operation of a selector lever along an H-shaped gearshift gate. The position sensor of the publication includes a shift magnet and shift detection elements, which detect operation of a selector lever in a shifting direction that is the front to rear direction of the vehicle, and a selection magnet and selection detection elements, which detect operation of the selector lever in a selection direction that is the sideward direction of the vehicle. The position sensor determines the operation of the selector lever from a combination of detection signals generated by the detection elements.

However, the position sensor of the publication requires the shift magnet and the selection magnet. Thus, the sensor includes many components and is relatively large.

SUMMARY OF THE INVENTION

One aspect of the present invention is a position sensor for a transmission mode selector lever. The position sensor includes a magnet and three or more magnetic flux detection elements that detect magnetic flux of the magnet. The three or more magnetic flux detection elements are arranged opposing the magnet. A determination circuit determines an operation position of the transmission mode selector lever based on output levels of detection signals generated by the three or more magnetic flux detection elements. The magnet includes a first magnetized region and a second magnetized region. The first magnetized region is formed so that when the magnet is moved relative to the three or more magnetic flux detection elements along a first straight line that is an operation direction of the transmission mode selector lever, output levels of the detection signals generated by the three or more magnetic flux detection elements change in accordance with a proportional relationship having a first gradient relative to the distance of the movement. The second magnetized region is formed so that when the magnet is moved along a second straight line that is an operation direction of the transmission mode selector lever, parallel to the first straight line, and differs from the second straight line, output levels of the detection signals generated by the three or more magnetic flux detection elements change in accordance with a proportional relationship having a second gradient relative to the distance of the movement. One of the first and second gradients is a positive value. The other one of the first and second gradients is a negative value. The three or more detection elements are spaced apart from each other on a straight line that is parallel to the first straight line and the second straight line.

Another aspect of the present invention is a position sensor for a transmission mode selector lever. The position sensor includes a magnet and three or more magnetic flux detection elements that detect magnetic flux of the magnet. The three or more magnetic flux detection elements are arranged opposing the magnet. A determination circuit determines an operation position of the transmission mode selector lever based on output levels of detection signals generated by the three or more magnetic flux detection elements. The magnet includes a first magnetized region, a second magnetized region, and a third magnetized region. The first magnetized region is formed so that when the magnet is moved relative to the three or more magnetic flux detection elements along a first straight line that is an operation direction of the transmission mode selector lever, output levels of the detection signals generated by the three or more magnetic flux detection elements change in accordance with a proportional relationship having a first gradient relative to the distance of the movement. The second magnetized region is formed so that when the magnet is moved along a second straight line that is an operation direction of the transmission mode selector lever, parallel to the first straight line, and differs from the second straight line, output levels of the detection signals generated by the three or more magnetic flux detection elements change in accordance with a proportional relationship having a second gradient relative to the distance of the movement. One of the first and second gradients is a positive value and the other one of the first and second gradients is a negative value. The third magnetized region is magnetized in the same manner as the first magnetized region and arranged parallel to the first and second magnetized regions sandwiching the second magnetized region with the first magnetized region. The three or more detection elements include one or more first magnetic flux detection elements, which oppose the first magnetized region and are arranged on a straight line, and one or more second magnetic flux detection elements, which oppose the second magnetized region and are arranged on a further straight line. The one or more second magnetic flux detection elements are located at positions separated from straight lines, on which the one or more first magnetic flux detection elements are arranged, extending orthogonal to the first and second straight lines.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE INVENTION

A first embodiment of a position sensor 1 for a transmission mode selector lever (shift lever) will now be described. The position sensor 1 is applied to a transmission shifter that includes the transmission mode selector lever. One example of a position sensor may be applied to a shift-by-wire type transmission shifter. Another example of a position sensor may be applied to transmission shifter that mechanically couples a transmission mode selector lever and a vehicle transmission. Further, the transmission shifter may be of a stationary type that holds the transmission mode selector lever at a selected position when, for example, the driver moves the selector lever to the selected position and releases the selector lever. The transmission shifter may also be of a momentary type in which the transmission mode selector lever returns to a home position when the driver releases the selector lever.

The transmission shifter of the first embodiment includes a transmission mode selector lever 50 arranged between the driver seat and passenger seat. A knob, which can be gripped by the driver, is arranged on a distal portion of the transmission mode selector lever 50. The position sensor 1 is arranged on a basal portion of the transmission mode selector lever 50. The position sensor 1 detects the position (operation position) of the transmission mode selector lever 50 when operated by the driver. The detection result of the position sensor 1 is reflected on the transmission mode.

Figure 1:
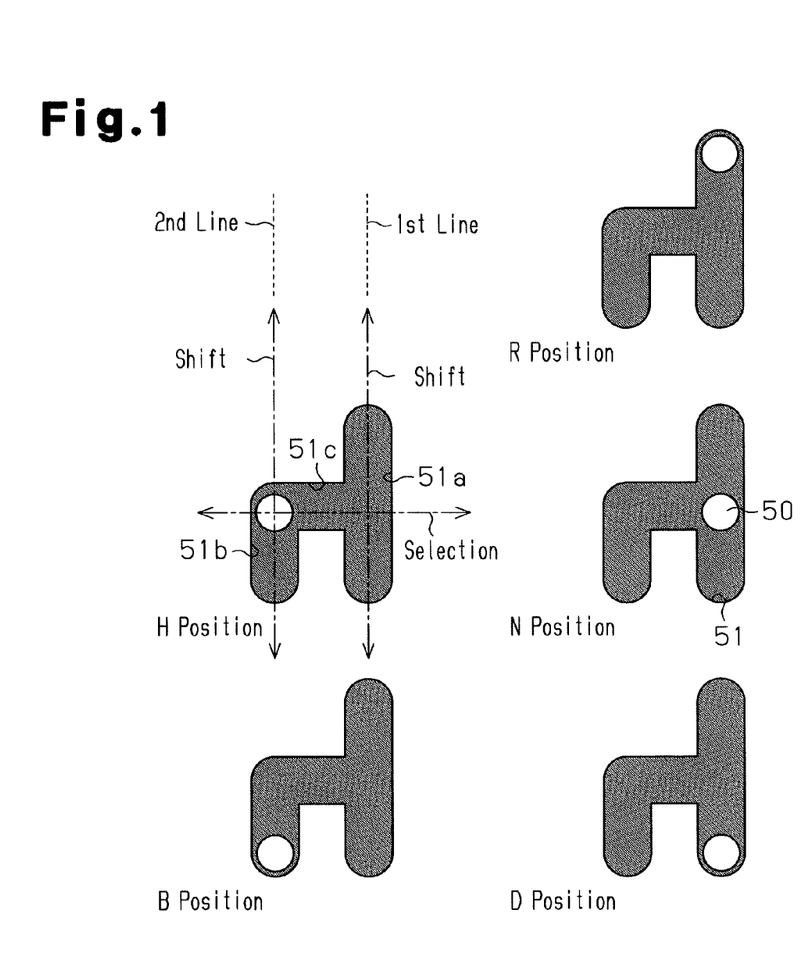
FIG. 1 is a schematic diagram showing operation positions of a transmission mode selector lever.

FIG. 1 shows an h-shaped gearshift gate 51. The transmission mode selector lever 50 is movable along the gearshift gate 51. Three positions, namely, a reverse (R) position, a neutral (N) position, and a drive (D) position, are set on a first straight line. Two positions, namely, a home (H) position and a regenerative brake (B) position, are set on a second straight line. When the transmission mode selector lever 50 is operated along the first straight line, the operation position is switched between the reverse (R), neutral (N), and drive (D) positions. When the transmission mode selector lever 50 is operated along the second straight line, which is parallel to the first straight line, the operation position is switched between the home (H) and neutral (N) positions.

In the illustrated example, the gearshift gate 51 includes a first passage 51a (first shift passage), a second passage 51b (second shift passage), and a third passage 51c (select passage). The movement or operation of the lever 50 along the first passage 51a or second passage 51b may be referred to as movement or operation in the front to rear direction of the vehicle or the shift direction. The movement or operation of the lever 50 along the third passage 51c may be referred to as movement or operation in the sideward direction of the vehicle or the selection direction.

Figure 2A:
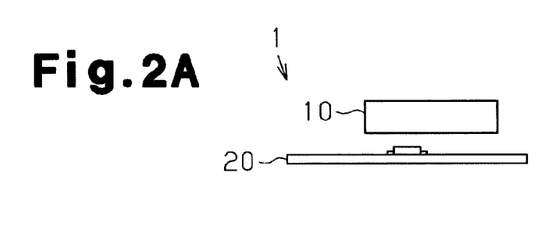
FIG. 2A is a side view showing a position sensor in one embodiment.
Figure 2B:
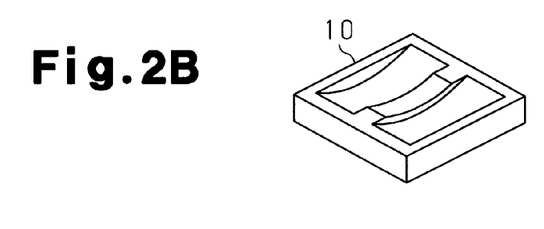
FIG. 2B is a perspective view showing a magnet from a lower side of the position sensor.
Figure 2C:
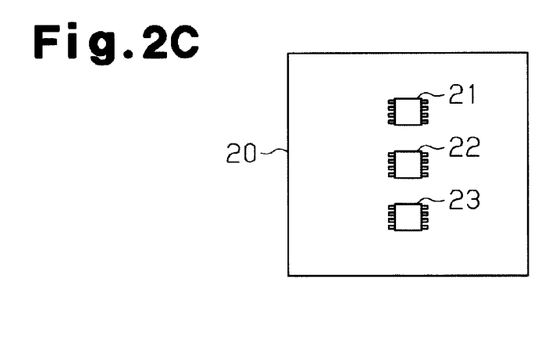
FIG. 2C is a plan view of a substrate including Hall ICs.

Referring to FIG. 2A, the position sensor 1 includes a single magnet 10 and three Hall ICs 21 to 23 opposing a lower surface of the magnet 10. The magnet 10 moves integrally with the transmission mode selector lever 50. The Hall ICs 21 to 23 are fixed to a substrate 20. The Hall ICs 21 to 23 are arranged at equal intervals along a straight line that is parallel to the first and second straight lines. The lower surface of the magnet 10 is referred to as a first surface.

Figure 3A:
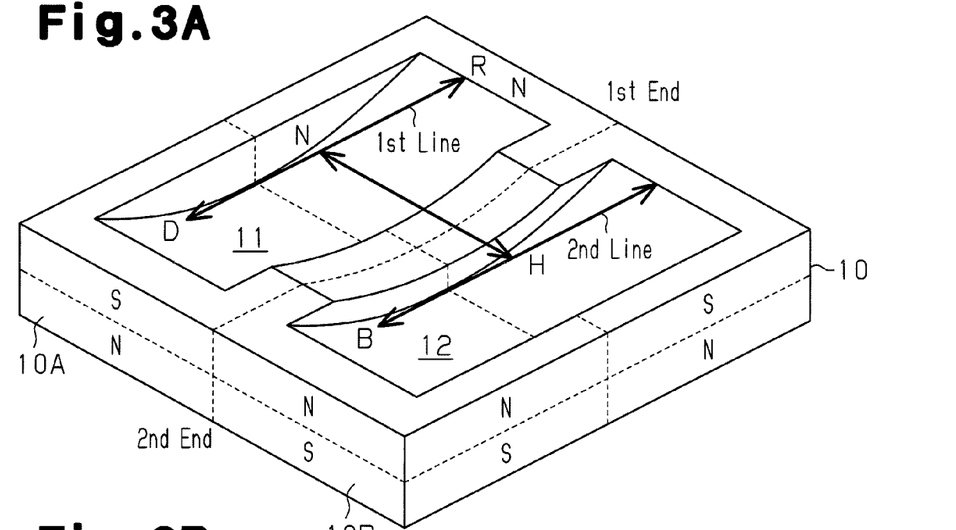
FIG. 3A is a perspective view showing a magnet.

As shown in FIG. 3A, the lower surface of the magnet 10, which opposes the Hall ICs 21 to 23, includes a first groove 11, which extends parallel to the first straight line, and a second groove 12, which extends parallel to the second straight line. The first and second grooves 11 and 12 each include a concave bottom surface curved away from the Hall ICs 21 to 23. In the example of FIG. 3A, the grooves 11 and 12 each have a substantially fixed width. The first groove 11 and the second groove 12 are arranged next to each other in a direction orthogonal to the first and second straight lines. One half of the magnet 10 including the first groove 11 is magnetized to form a first magnetized region 10A. The remaining half of the magnet 10 including the second groove 12 is magnetized to form a second magnetized region 10B.

The magnet 10 includes a first end and a second end. The first magnetized region 10A includes the first end and second end of the magnet 10. Further, in the lower surface, or front surface, of the magnet 10, the first magnetized region 10A includes an N-pole region and an S-pole region sequentially arranged in this order from the first end to the second end along the first straight line. In the rear surface, which is opposite to the front surface, of the magnet 10, the first magnetized region 10A includes an S-pole region and an N-pole region sequentially arranged in this order from the first end to the second end along the first straight line. In the same manner, in the front surface, the second magnetized region 10B includes an S-pole region and an N-pole region sequentially arranged in this order from the first end to the second end along the second straight line. In the rear surface, the second magnetized region 10B includes an N-pole region and an S-pole region sequentially arranged in this order from the first end to the second end along the second straight line.

Figure 3B:
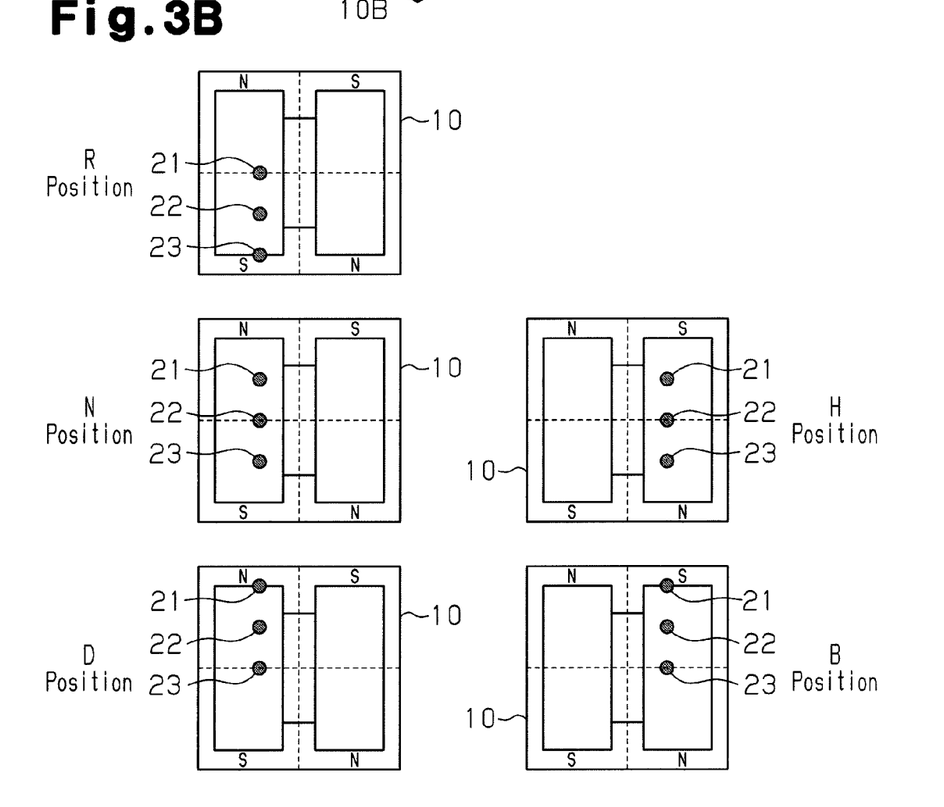
FIG. 3B is a schematic diagram showing relative positions of the magnet and Hall ICs.
Figure 4A:
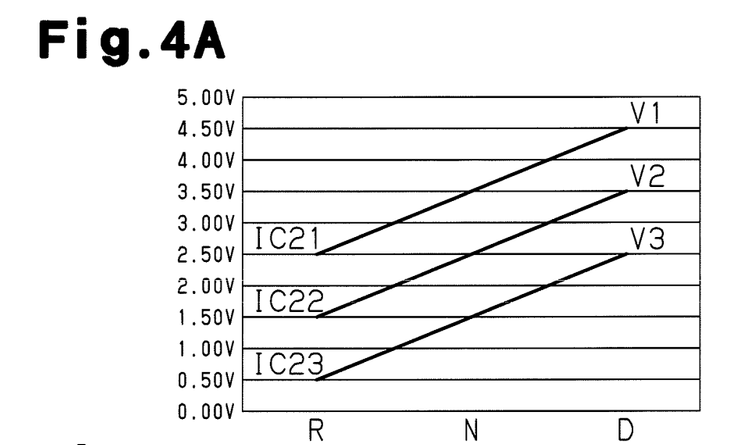
FIG. 4A is a graph showing the output voltage of each Hall IC when the lever is moved along a first passage of FIG. 1.
Figure 4B:
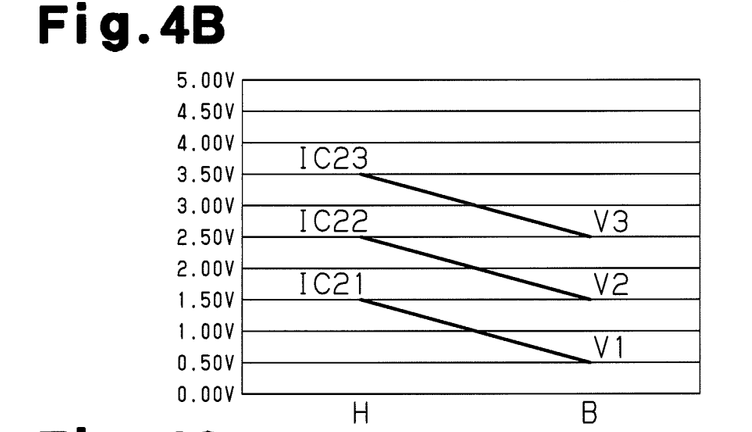
FIG. 4B is a graph showing the output voltage of each Hall IC when the lever is moved along a second passage of FIG. 1.
Figure 4C:
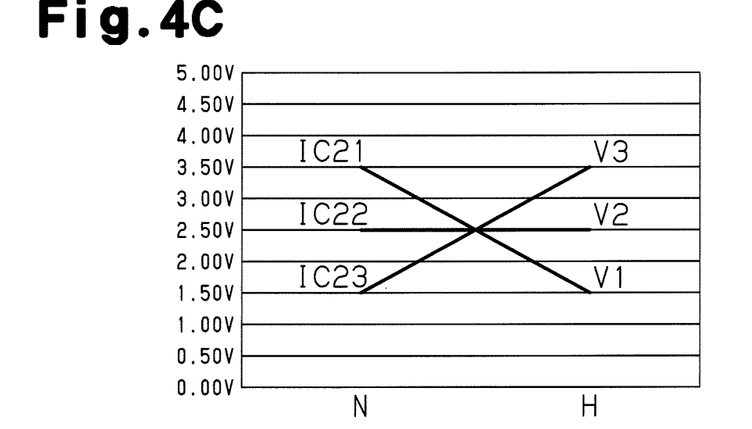
FIG. 4C is a graph showing the output voltage of each Hall IC when the lever is moved along a third passage of FIG. 1.

Referring to FIG. 3, when the transmission mode selector lever 50 is operated along the gearshift gate 51, the relative positions of the magnet 10 and the Hall ICs 21 to 23 change in accordance with the operation position. As shown in FIG. 4, the output voltages V1, V2, and V3 of the Hall ICs 21 to 23 change in accordance with the operation position.

As shown in FIG. 4A, when the transmission mode selector lever 50 is operated and moved along the first straight line from the R position via the N position to the D position, the output voltages V1 to V3 of the Hall ICs 21 to 23 change in accordance with a proportional relationship having a positive gradient while maintaining the relationship of V1>V2>V3. This proportional relationship is determined by the fact that the first magnetized region 10A is formed so that the magnetic flux density of the first magnetized region 10A changes in proportion to the movement distance of the magnet 10 along the first straight line and the fact that the first magnetized region 10A includes the N-pole region and S-pole region sequentially arranged from the first end to the second end in the first surface opposing the Hall ICs 21 to 23.

In the first embodiment, the output voltage of each of the Hall ICs 21 to 23 increases as an N-pole end (first end in FIG. 3A) becomes closer like the Hall IC 21 located at the D position in FIG. 3B. In contrast, the output voltage of each of the Hall ICs 21 to 23 decreases as an S-pole end (second end in FIG. 3A) becomes closer like the Hall IC 23 located at the R position in FIG. 3B.

As shown in FIG. 4B, when the transmission mode selector lever 50 is operated and moved along the second straight line from the H position to the B position, the output voltages V1 to V3 of the Hall ICs 21 to 23 change in accordance with a proportional relationship having a negative gradient while maintaining the relationship of V1<V2<V3. This proportional relationship is determined by the fact that the second magnetized region 10B is formed so that the magnetic flux density of the second magnetized region 10B changes in proportion to the movement distance of the magnet 10 along the second straight line and the fact that the second magnetized region 10B includes the S-pole region and N-pole region sequentially arranged from the first end to the second end in the first surface opposing the Hall ICs 21 to 23.

In one example, when the first magnetized region 10A is moved by a predetermined direction (from the N position to the D position) in a certain direction in a state opposing the Hall ICs 21 to 23, the output voltages V1 to V3 are increased by a first change amount. When the second magnetized region 10B is moved by the predetermined direction (from the H position to the B position) in the certain direction in a state opposing the Hall ICs 21 to 23, the output voltages V1 to V3 are decreased by a second change amount. It is preferred that the first change amount have the same absolute value as the second change amount. However, the first and second change amounts may have different absolute values.

Figure 5:
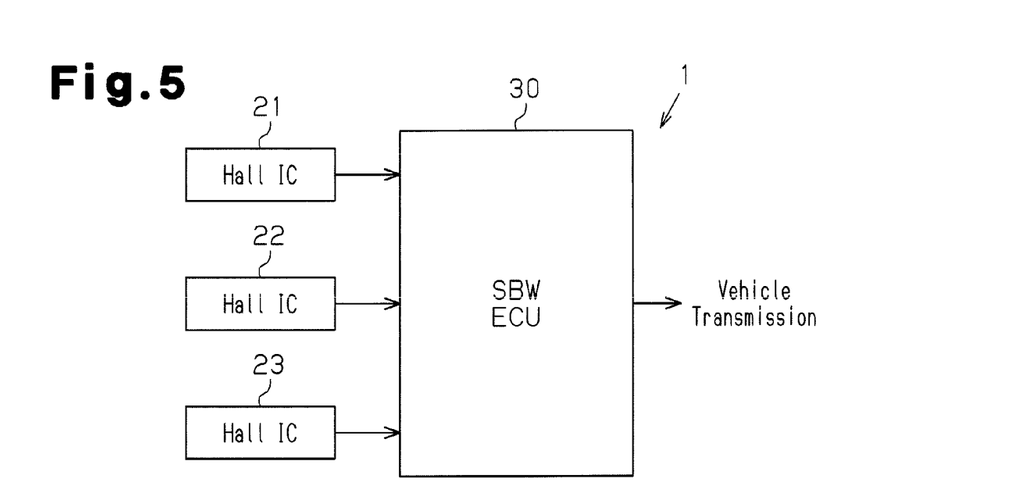
FIG. 5 is a block diagram of the position sensor.

As shown in FIG. 5, the Hall ICs 21 to 23 are electrically connected to a shift-by-wire electronic control unit 30, which functions as a determination circuit. The shift-by-wire electronic control unit 30 monitors the output voltages V1 to V3 of the Hall ICs 21 to 23 and determines the operation position of the transmission mode selector lever based on the combination of the output voltages V1 to V3.

The operation of the position sensor 1 will now be described.

When the transmission mode selector lever 50 is not operated, the selector lever 50 is located at the H position. In this case, as shown in FIG. 4B, the output voltage Vi of the Hall IC 21 is 1.5 V, the output voltage V2 of the Hall IC 22 is 2.5 V, and the output voltage V3 of the Hall IC 23 is 3.5 V. Since the output voltages V1 to V3 are in a relationship of V1<V2<V3, the shift-by-wire electronic control unit 30 determines that the transmission mode selector lever 50 is arranged on the second straight line. Further, based on the values of the output voltages V1 to V3, the electronic control unit 30 determines that the transmission mode selector lever 50 is located at the H position on the second straight line.

The shift-by-wire electronic control unit 30 may compare the differences between the output voltages V1 to V3 with reference values, which may be design values that take into consideration a predetermined tolerance, to determine whether there is an abnormality in any of the Hall ICs 21 to 23. For example, when the output voltage of a Hall IC has an abnormal value, the Hall IC is likely to have an abnormality. Thus, when an abnormal output difference that exceeds a reference value taking the tolerance into consideration, the electronic control unit 30 determines that a Hall IC is abnormal and determines the operation position based on the normal output differences.

When the transmission mode selector lever 50 is operated and moved from the H position via the N position to the D position, as shown in FIG. 4A, the output voltage V1 of the Hall IC 21 is 4.5 V, the output voltage V2 of the Hall IC 22 is 3.5 V, and the output voltage V3 of the Hall IC 23 is 2.5 V.

Since the output voltages V1 to V3 are in a relationship of V1>V2>V3, the shift-by-wire electronic control unit 30 determines that the transmission mode selector lever 50 is arranged on the first straight line. Further, based on the values of the output voltages V1 to V3, the electronic control unit 30 determines that the transmission mode selector lever 50 is located at the D position on the first straight line. In accordance with the operation position, the shift-by-wire electronic control unit 30 shifts the automatic transmission mode to a drive mode. As a result, the vehicle can be driven forward.

When an operation position other than the H position and D position is selected, the electronic control unit 30 determines whether the transmission mode selector lever 50 is located on the first straight line or the second straight line. Then, the electronic control unit 30 determines the operation position from the output voltages V1 to V3. Further, the electronic control unit 30 compares the differences between the output voltages V1 to V3 with the reference values. When an output difference differs greatly from the reference value, the electronic control unit 30 determines that a Hall IC is abnormal.

The first embodiment has the advantages described below.

(1) The output voltages V1 to V3 of the Hall ICs 21 to 23, which are arranged along a straight line that is parallel to the first and second straight lines, have a relationship when the transmission mode selector lever 50 is located at an operation position on the first straight line that is reversed from that when the transmission mode selector lever 50 is located at an operation position on the second straight line. Thus, based on the relationship of the output voltages V1 to V3, the electronic control unit 30 can determine whether the transmission mode selector lever 50 is located on the first straight line or the second straight line. Further, the electronic control unit 30 can determine the operation position of the transmission mode selector lever 50 based on the values of the output voltages V1 to V3. Moreover, the first and second magnetized regions 10A and 10B of the magnet 10 allows for detection of a plurality of positions (five in the fifth embodiment) with the single magnet 10 and eliminates the need to increase the number of magnets. Accordingly, a miniaturized position sensor can be provided.

(2) In the preferred example, the Hall ICs 21 to 23 are arranged at equal intervals on a straight line parallel to the first straight line and the second straight line. In this structure, the differences between the output voltages V1 to V3 of the Hall ICs 21 to 23 are directly determined by the intervals between the Hall ICs 21 to 23. Thus, when a difference between the output voltages differs greatly from the design value, it can be determined that there is an abnormality in one or more Hall elements.

(3) The differences between the output voltages V1 to V3 are directly determined by the intervals between the Hall ICs 21 to 23. Thus, when there are a plurality of Hall ICs (e.g., three) and when one of the Hall ICs is determined as being abnormal, the electronic control unit 30 can use the remaining Hall ICs to detect the operation position of the transmission mode selector lever 50.

(4) The position sensor 1 can detect five operation positions with three Hall ICs 21 to 23. In this manner, the number of magnetic flux detection elements may be less than the number of detected operation positions.

(5) The number of magnetic flux detection elements such as Hall ICs can be decreased. Thus, the number of harnesses connected to output terminals of the magnetic flux detection elements can be decreased.

It should be apparent to those skilled in the art that the present invention may be embodied in many other specific forms without departing from the spirit or scope of the invention. Particularly, it should be understood that the present invention may be embodied in the following forms.

In the above embodiment, the first magnetized region 10A and the second magnetized region 10B are formed so that the magnetic flux density of each of the first and second magnetized regions 10A and 10B is proportional to the movement distance of the magnet 10. However, as long as the output levels of the Hall ICs 21 to 23 changes in proportion to the movement distance of the magnet 10, the magnetic flux density of each of the first and second magnetized regions 10A and 10B does not have to be proportional to the movement distance of the magnet 10. Further, as long as computation results of the of the shift-by-wire electronic control unit 30 based on the output voltages are proportional to the movement distance of the magnet 10, changes in the output voltages of the Hall ICs 21 to 23 do not have to be proportional to the movement distance of the magnet 10.

Four or more magnetic flux detection elements, such as Hall ICs, may be arranged spaced apart from one another along a straight line that is parallel to the first and second straight lines. In such a case, even when one of the magnetic flux detection elements is determined as being abnormal, the remaining three or more magnetic flux detection elements may be used to detect the operation position. Further, even when two of the magnetic flux detection elements are determined as being abnormal, the remaining two or more magnetic flux detection elements may be used to detect the operation position. In this manner, even when there are magnetic flux detection elements that are determined as being abnormal, as long as two or more normal magnetic flux detection elements are remaining, the straight line on which the transmission mode selector lever 50 is arranged can be determined from the relationship of the detection signals generated by the normal magnetic flux detection elements, and the operation position of the transmission mode selector lever 50 can be determined from the values of the detection signals.

The magnetic flux detection elements can be arranged at equal intervals. For example, three magnetic flux detection elements can be arranged at intervals of 1:2 on a straight line parallel to the first and second straight lines. In this case, the output difference of the detection signals of the magnetic flux detection elements are directly determined based on the intervals between the elements. Accordingly, when an output difference differs greatly from a reference value, it can be determined that a magnetic flux detection element is abnormal.

Figure 6:
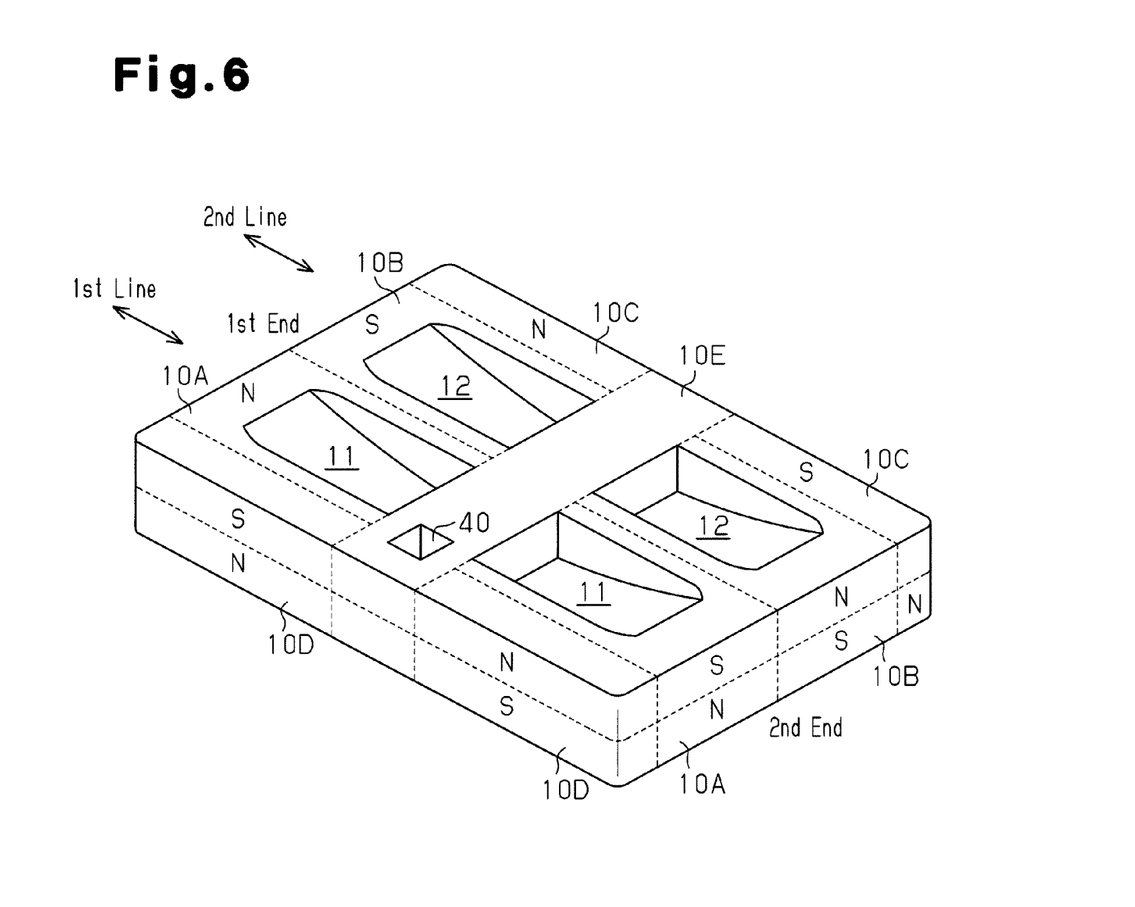
FIG. 6 is a perspective view showing a magnet of a position sensor in another embodiment.

Referring to FIG. 6, the magnet 10 may further include a first magnetized adjustment portion 10C, which is magnetized in the same manner as the first magnetized region 10A, and a second magnetized adjustment portion 10D, which is magnetized in the same manner as the second magnetized region 10B. The second magnetized region 10B is arranged between the first magnetized region 10A and the first magnetized adjustment portion 10C. The first magnetized region 10A is arranged between the second magnetized region 10B and the second magnetized adjustment portion 10D. In this structure, the magnetic flux around the second magnetized region 10B is substantially symmetric at the side closer to the first magnetized region 10A and the side closer to the first magnetized adjustment portion 10C. Further, the magnetic flux around the first magnetized region 10A is substantially symmetric at the side closer to the second magnetized region 10B and the side closer to the second magnetized adjustment portion 10D. Thus, even when the operation of the transmission mode selector lever 50 is deviated from the first straight line or the second straight line for a certain amount in a direction perpendicular to the straight line, the output voltages V1 to V3 of the Hall ICs 21 to 23 is the same as when such deviation does not occur. This enlarges the tolerable range for the mode selection operation.

Further, as shown in FIG. 6, the magnet 10 can include a non-magnetized portion 10E that intersects with the first and second straight lines. The non-magnetized portion 10E may be parallel to the first and second ends. The non-magnetized portion 10E may be solid but may include a coupling hole 40. The formation of a hole in a magnetized portion affects the magnetic flux of the magnetized portion. However, the hole 40 formed in the non-magnetized portion 10E does not affect any of the magnetized portions. The non-magnetized portion 10E is arranged at a position where it does not affect the magnetic flux detected by the Hall ICs 21 to 23. Thus, the output voltages V1 to V3 are stable. An example of a method for manufacturing the magnet 10 of FIG. 6 will now be described. A block is molded, for example, from a plastic including magnetic particles. Then, the block is magnetized excluding the non-magnetized portion 10E. This manufactures the magnet 10 (plastic magnet). The magnet 10 of the first embodiment may be manufactured in the same manner excluding the formation of the non-magnetized portion 10E.

A magnet 10 may include the first magnetized adjustment portion 10C and the second magnetized adjustment portion 10D of FIG. 6 and not include the non-magnetized portion 10E. Alternatively, a magnet 10 may include the non-magnetized portion 10E of FIG. 6 and not include the first magnetized adjustment portion 10C and the second magnetized adjustment portion 10D.

Figure 7:
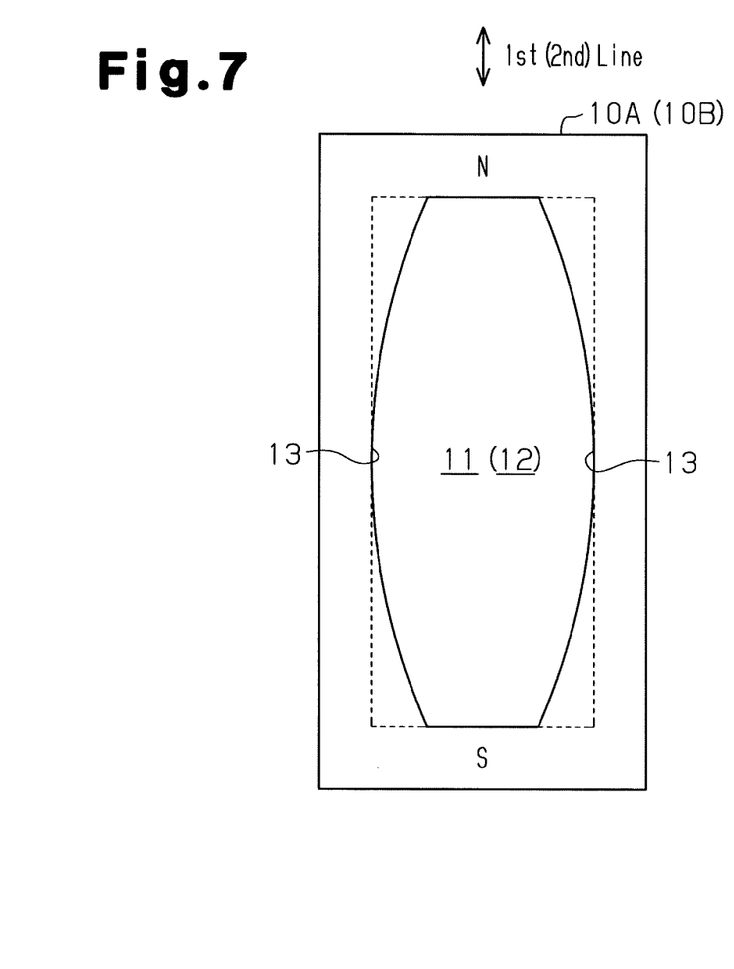
FIG. 7 is a partial plan view showing a magnet of a position sensor in a further embodiment.

As shown in FIG. 7, the first groove 11 and the second groove 12 may include a concave bottom surface, which is formed so that the depth of the corresponding groove gradually changes, and two concave side surfaces 13, which are formed so that the width of the corresponding groove gradually changes. For example, the concave side surfaces 13 may be formed so that the width of each of the grooves 11 and 12 becomes maximal at or proximal to a middle position between the first and second ends. In this case, even when the operation of the transmission mode selector lever 50 is deviated from the first straight line or the second straight line for a certain amount in a direction perpendicular to the straight line, the output voltages V1 to V3 of the Hall ICs 21 to 23 is the same as when such deviation does not occur. This enlarges the tolerable range for the mode selection operation.

Figure 8:
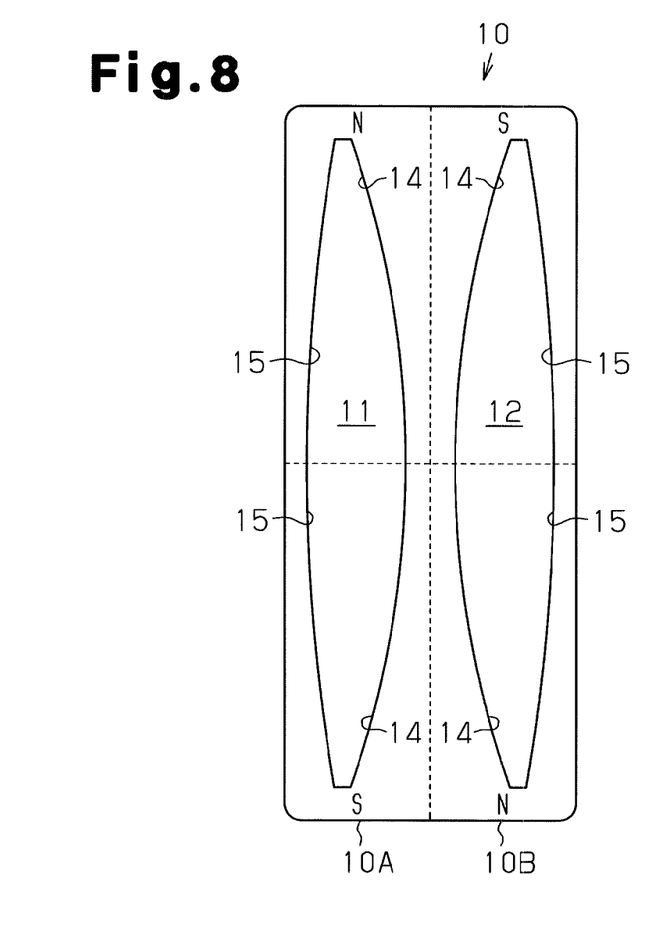
FIG. 8 is a plan view showing a magnet of a position sensor in a further embodiment.

In the example of FIG. 7, each groove includes the two concave side surfaces 13, which have the same curvature. In the example of FIG. 8, each groove includes two concave side surfaces 14 and 15 having different curvatures. The first concave side surface 14 is adjacent to a boundary of the first magnetized region 10A and the second magnetized region 10B. In other words, the first concave side surface 14 is proximal to the adjacent magnetized region. The second concave side surface 15 is not adjacent to the boundary of the first magnetized region 10A and the second magnetized region 10B. In other words, the second concave side surface 15 is not adjacent to any magnetized region. The first concave side surface 14 has a larger curvature than the second concave side surface 15. In other words, the first concave side surface 14 has a smaller radius of curvature than the second concave side surface 15. This form improves the magnet performance and enlarges the tolerable range for the mode selection operation. More specifically, the magnetic fluxes of two adjacent magnetized regions cancel each other at or near the boundary of the magnetized regions. This tends to lower the performance of magnet as a whole. However, by relatively increasing the curvature of the first concave side surface 14 that is proximal to the boundary, the performance of the magnet is not that much lowered.

Figure 9:
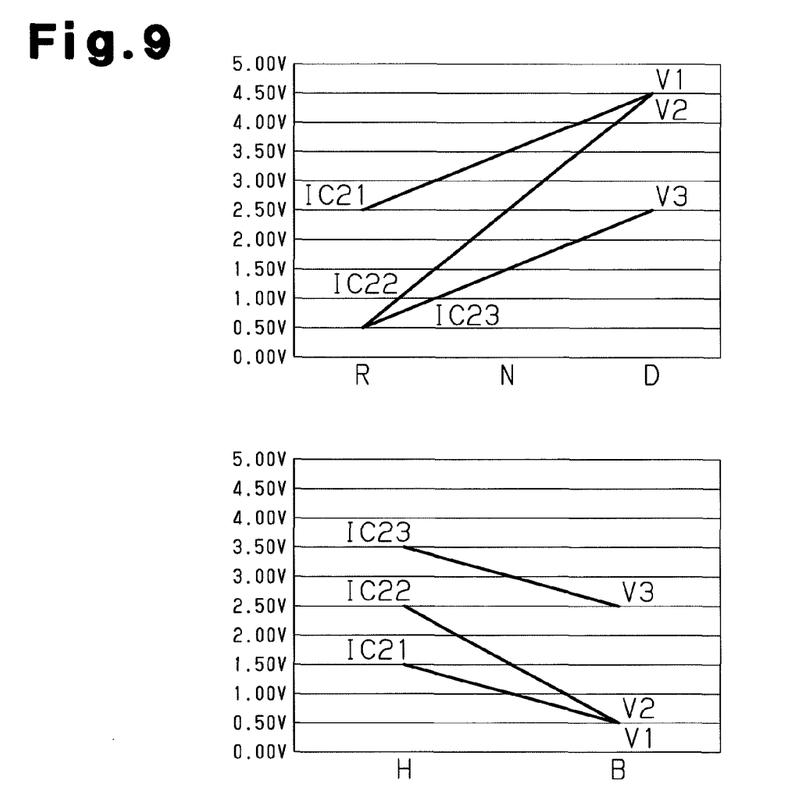
FIG. 9 is a graph showing output voltages of Hall ICs in a position sensor of a further embodiment.

The sensitivity of one of the Hall ICs 21 to 23 in the first embodiment, namely, the Hall IC 22, may be two times greater than the other IC Halls. In such a case, the output voltages V1 to V3 are as shown in FIG. 9. The characteristic line for the output voltage V2 of the high-sensitivity Hall IC 22 has a gradient that is one half the gradient of FIG. 4. Thus, the electronic control unit 30 can convert the output voltage V2 of the high-sensitivity Hall IC 22 in accordance with the conversion expression of "(V2−2.5)/2+2.5" and use the converted value to determine the operation position in the same manner as the first embodiment. In this example, the output voltage V2 of the high-sensitivity Hall IC 22 may be in the range from 0.5 V to 4.5 V. This range is two times larger than that of the first embodiment. Thus, noise resistance is improved.

Figure 10:
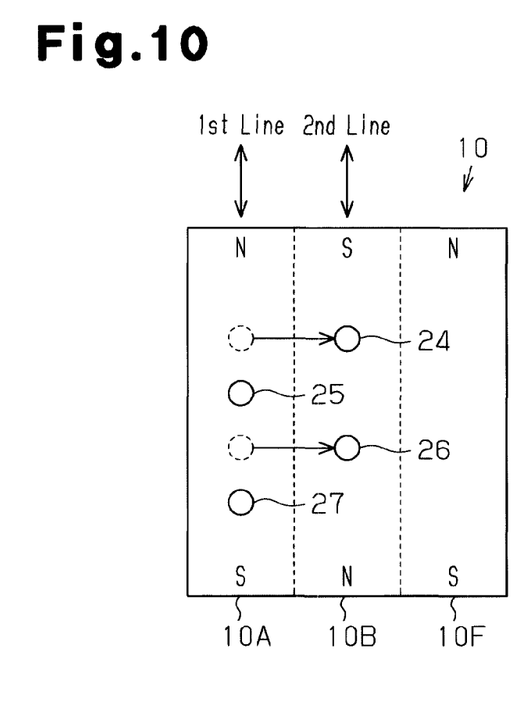
FIG. 10 is a schematic diagram showing relative positions of a magnet and magnetic flux detection elements in a position sensor of a further embodiment.

The minimum interval between the magnetic flux detection elements is determined in advance in accordance with the performance of the magnetic flux detection elements. As the number of magnetic flux detection elements arranged along a straight line increases, the entire length of the position sensor along the straight line increases. This elongates the position sensor. Thus, three or more magnetic flux detection elements may be arranged in two rows. FIG. 10 shows an example in which four magnetic flux detection elements 24 to 27 are arranged in two rows. The four magnetic flux detection elements 24 to 27 include the elements 25 and 27, which are arranged on a straight line opposing the first magnetized region 10A, and the elements 24 and 26, which are arranged on a straight line opposing the second magnetized region 10B. The elements 25 and 27 are not arranged on straight lines orthogonal to the first and second straight lines and including the element 24 or 26. Thus, for example, there is no straight line that is orthogonal to the first and second straight lines and extends through two or more magnetic flux detection elements. Further, the magnet 10 may include a third magnetized region 10F. The third magnetized region 10F is parallel to the first and second magnetized regions 10A and 10B, sandwiches the second magnetized region 10B with the first magnetized region 10A, and is magnetized in the same manner as the first magnetized region 10A.

Figure 11:
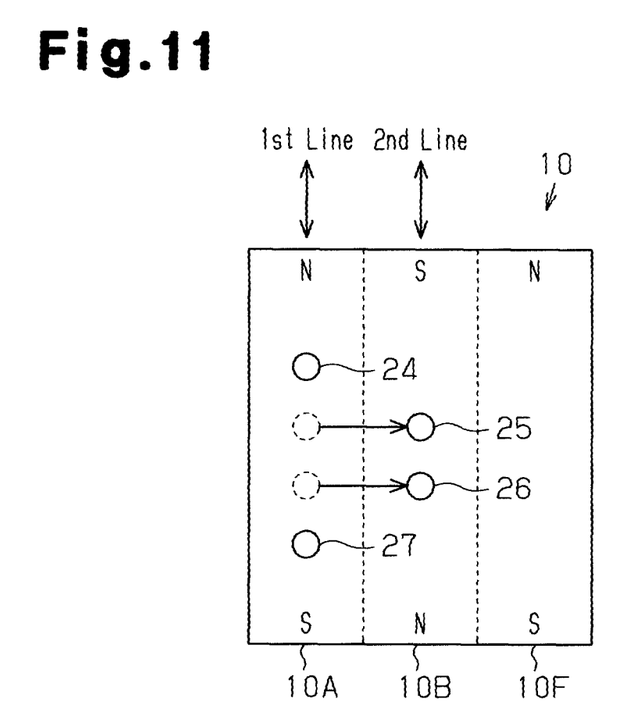
FIG. 11 is a schematic diagram showing relative positions of a magnet and magnetic flux detection elements in a position sensor of a further embodiment.

In the structure of FIG. 10, the shift-by-wire electronic control unit 30 handles the output voltages when the elements 25 and 27 detect the N-pole (S-pole) as being the same as the output voltages when the elements 24 and 26 detect the S-pole (N-pole). Thus, changes in the output voltages of the elements 24 to 27 are substantially the same as when the elements 24 to 27 are arranged on the same straight line. Further, three or more elements, namely, the elements 24 to 27, are arranged in two rows. Thus, the interval between the elements 24 and 26 and the interval between the elements 25 and 27 can be shortened thereby reducing the entire length of the position sensor. The layout of the elements 24 to 27 is not limited to that shown in FIG. 10 and may be changed, for example, to the layout shown in FIG. 11 or any other layout.

The magnetic flux detection elements are preferably Hall ICs that can detect the magnetic flux intensity. However, magnetoresistive elements or the like that detect the orientation of magnetic flux may be used as the magnetic flux detection elements.

The relative movement of the magnet and the magnetic flux detection elements when the transmission mode selector lever 50 is operated in not limited to the form of the above embodiment in which the magnet is movable and the magnetic flux detection elements are fixed. Instead, the magnetic flux detection elements may be movable, and the magnet may be fixed. Further, the magnet and the magnetic flux detection elements may both be movable. For example, the magnet and the magnetic flux detection elements may be moved in the same direction by different movement amounts. Alternatively, the magnet and the magnetic flux detection elements may be moved in different directions.

The gearshift gate 51 does not have to be h-shaped. For example, the gearshift gate 51 may have a pattern that is H-shaped or a pattern in which the selection direction is set at a location other than the middle position in the shift direction.

The present examples and embodiments are to be considered as illustrative and not restrictive, and the invention is not to be limited to the details given herein, but may be modified within the scope and equivalence of the appended claims.

The invention claimed is:

1. A position sensor for a transmission mode selector lever, the position sensor comprising:
   a magnet;
   three or more magnetic flux detection elements that detect magnetic flux of the magnet, wherein the three or more magnetic flux detection elements are arranged opposing the magnet; and
   a determination circuit that determines an operation position of the transmission mode selector lever based on output levels of detection signals generated by the three or more magnetic flux detection elements, wherein
   the magnet includes a first magnetized region and a second magnetized region,
   the first magnetized region is formed so that when the magnet is moved relative to the three or more magnetic flux detection elements along a first straight line that is an operation direction of the transmission mode selector lever, output levels of the detection signals generated by the three or more magnetic flux detection elements change in accordance with a proportional relationship having a first gradient relative to the distance of the movement,
   the second magnetized region is formed so that when the magnet is moved along a second straight line that is an operation direction of the transmission mode selector lever, parallel to the first straight line, and differs from the second straight line, output levels of the detection signals generated by the three or more magnetic flux detection elements change in accordance with a proportional relationship having a second gradient relative to the distance of the movement,
   one of the first and second gradients is a positive value,
   the other one of the first and second gradients is a negative value, and
   the three or more detection elements are spaced apart from each other on a straight line that is parallel to the first straight line and the second straight line.

2. The position sensor according to claim 1, wherein
the magnet includes a first surface opposing the magnetic flux detection elements, a second surface opposite to the first surface, and first and second ends intersecting with the first and second straight lines,
the first magnetized region includes, in the first surface, an N-pole region and an S-pole region sequentially arranged in this order from the first end to the second end along the first straight line,
the first magnetized region includes, in the second surface, an S-pole region and an N-pole region sequentially arranged in this order from the first end to the second end along the first straight line,
the second magnetized region includes, in the first surface, an S-pole region and an N-pole region sequentially arranged in this order from the first end to the second end along the second straight line, the second magnetized region includes, in the second surface, an N-pole region and an S-pole region sequentially arranged in this order from the first end to the second end along the second straight line, and the first and second magnetized regions each include a non-magnetized portion that does not generate magnetic flux, and the non-magnetized portion is defined between the S-pole region and the N-pole region and intersects with the first and second straight lines.

3. The position sensor according to claim 1, wherein
the magnet includes a first surface opposing the magnetic flux detection elements,
the first surface of the magnet includes a first groove, which extends parallel to the first straight line, and a second groove, which extends parallel to the second straight line,
the first and second grooves each include
a concave bottom surface curved so that the corresponding groove has a depth that gradually changes, and
two concave side surfaces curved so that the corresponding groove has a width that gradually changes.

4. The position senor according to claim 3, wherein
the two concave side surfaces of each of the first and second grooves include
a first concave side surface that is adjacent to a boundary of the first magnetized region and the second magnetized region, and
a second concave side surface that is not adjacent to the boundary of the first magnetized region and the second magnetized region,
the first concave side surface has a larger curvature than the second concave side surface.

5. The position sensor according to claim 1, wherein
the first magnetized region and the second magnetized region are arranged next to each other and have a boundary that is parallel to the first straight line and the second straight line,
the magnet further includes a first magnetized adjustment portion, which is magnetized in the same manner as the first magnetized region, and a second magnetized adjustment portion, which is magnetized in the same manner as the second magnetized region,
the second magnetized region is arranged between the first magnetized region and the first magnetized adjustment portion, and
the first magnetized region is arranged between the second magnetized region and the second magnetized adjustment portion.

6. The position sensor according to claim 1, wherein the three or more magnetic flux detection elements are arranged at equal intervals along a straight line parallel to the first straight line and the second straight line.

7. A position sensor for a transmission mode selector lever that can be arranged at a plurality of operation positions, the position sensor comprising:
a magnet that moves integrally with the transmission mode selector lever;
three or more magnetic flux detection elements arranged opposing the magnet; and
a determination circuit that determines an operation position of the transmission mode selector lever based on output levels of detection signals generated by the three or more magnetic flux detection elements, wherein
the magnet includes a first magnetized region, which extends along a first straight line, and a second magnetized region, which extends along a second straight line that differs from the first straight line and extends parallel to the first straight line,
one of the first magnetized region and the second magnetized region opposes the three or more magnetic flux detection elements in accordance with the operation position of the transmission mode selector lever,
when operation of the transmission mode selector lever moves the first magnetized region in a certain direction in a state in which the first magnetized region opposes the three or more magnetic flux detection elements, the output levels of the detection signals generated by the three or more magnetic flux elements are increased in proportion to the distance of the movement, and
when operation of the transmission mode selector lever moves the second magnetized region in the certain direction in a state in which the second magnetized region opposes the three or more magnetic flux detection elements, the output levels of the detection signals generated by the three or more magnetic flux elements are decreased in proportion to the distance of the movement.

8. The position sensor according to claim 7, wherein
the first magnetized region includes a first groove extending parallel to the first straight line,
the second magnetized region includes a second groove extending parallel to the second straight line,
the first and second grooves each includes a concave bottom surface formed so that the corresponding groove has a depth that gradually changes.

9. The position sensor according to claim 8, wherein the first and second grooves each have a fixed width.

10. The position sensor according to claim 8, wherein the first and second grooves each include a concave side surface formed so that the corresponding groove has a groove width that gradually changes and becomes maximum at a longitudinally middle position.

11. The position sensor according to claim 10, wherein
each of the first and second grooves includes
a first concave side surface that is adjacent to a boundary of the first magnetized region and the second magnetized region, and
a second concave side surface that is not adjacent to the boundary of the first magnetized region and the second magnetized region; and
the first concave side surface has a larger curvature than the second concave side surface.

12. The position sensor according to claim 7, wherein
when the first magnetized region is moved by a predetermined distance in the certain direction in a state in which the first magnetized region opposes the three or more magnetic flux detection elements, the output levels of the detection signals generated by the three or more magnetic flux detection elements are increased by a first change amount, and
when operation of the transmission mode selector lever moves the second magnetized region in the certain direction in a state in which the first magnetized region opposes the three or more magnetic flux detection elements, the output levels of the detection signals generated by the three or more magnetic flux elements are decreased by a second change amount having an absolute value that is the same as that of the first change amount.

13. The position sensor according to claim 7, wherein
the first and second magnetized regions each include an S-pole region, an N-pole region, and a non-magnetized portion between the S-pole region and the N-pole region, and
the non-magnetized region does not generate a magnetic flux.

14. A position sensor for a transmission mode selector lever, the position sensor comprising:
a magnet that moves integrally with the transmission mode selector lever; and
three or more magnetic flux detection elements that detect magnetic flux of the magnet, wherein
the magnet includes a first surface, which opposes the three or more magnetic flux detection elements, and
the first surface includes S-pole regions and N-pole regions that are arranged in a checkerboard pattern, wherein
the three or more magnetic flux detection elements are arranged on a flat substrate,
the first surface of the magnet includes a plurality of grooves, and
each of the grooves includes a curved bottom surface formed so that a distance between the magnet and each of the three or more magnetic flux detection elements changes in accordance with an operation position of the transmission mode selector lever.

15. The position sensor according to claim 14, wherein the S-pole regions and the N-pole regions entirely occupy the first surface of the magnet.

16. The position sensor according to claim 15, wherein
the magnet has a flat tetragonal plate-shaped form,
the S-pole regions are two S-pole regions occupying opposing corners in the first surface of the magnet, and
the N-pole regions are two N-pole regions occupying different opposing corners in the first surface of the magnet.

17. The position sensor according to claim 14, wherein
the transmission mode selector lever is movable in a gearshift gate along parallel first and second passages and a third passage, which intersects with the first and second passages, and
the grooves are associated with the first and second passages.

* * * * *

UNITED STATES PATENT AND TRADEMARK OFFICE
CERTIFICATE OF CORRECTION

Page 1 of 1

| | |
|---|---|
| PATENT NO. | : 9,163,957 B2 |
| APPLICATION NO. | : 13/606525 |
| DATED | : October 20, 2015 |
| INVENTOR(S) | : M. Iwata |

It is certified that error appears in the above-identified patent and that said Letters Patent is hereby corrected as shown below:

Claims

Column 11, line 23 (claim 4, line 1) please change "position senor" to -- position sensor --.

Signed and Sealed this
Twenty-fourth Day of May, 2016

Michelle K. Lee
*Director of the United States Patent and Trademark Office*